H. W. OSTROM.
Cultivator.
No. 69,239.
Patented Sept. 24, 1867.
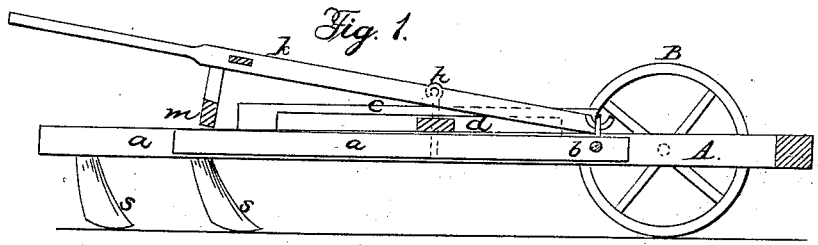
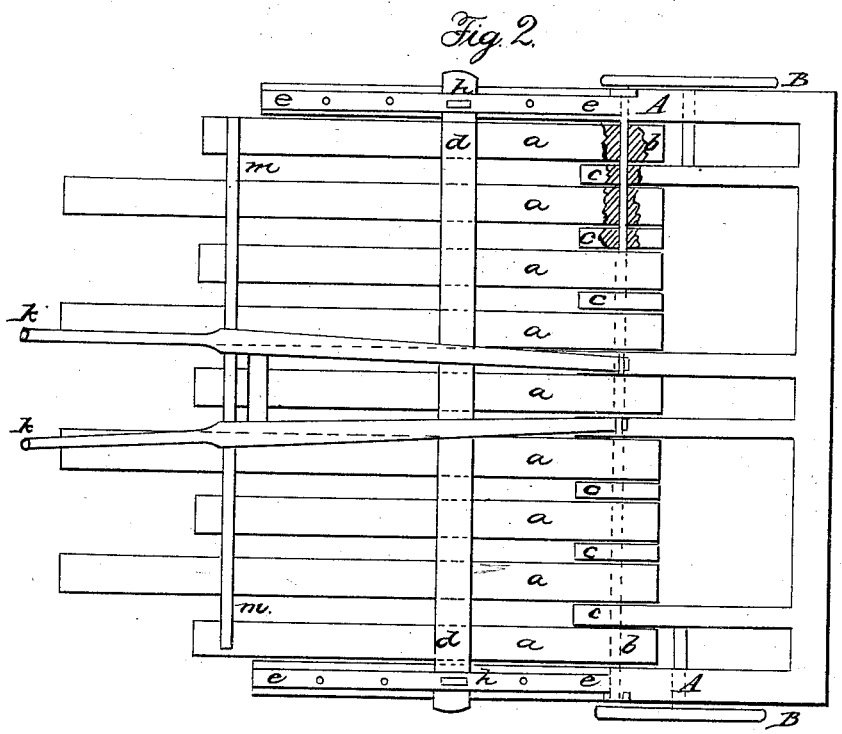

United States Patent Office.

HENRY W. OSTROM, OF GRAND RAPIDS, MICHIGAN.

Letters Patent No. 69,239, dated September 24, 1867.

IMPROVEMENT IN HARROW CULTIVATORS.

The Schedule referred to in these Letters Patent and making part of the same.

TO ALL WHOM IT MAY CONCERN:

Be it known that I, HENRY W. OSTROM, of Grand Rapids, in the county of Kent, and State of Michigan, have invented a new and useful Improvement in Harrow Cultivator; and I do hereby declare that the following is a full, clear, and exact description thereof, which will enable those skilled in the art to make and use the same, reference being had to the accompanying drawings, forming part of this specification, in which—

Figure 1 is a side view of my improved cultivator.

Figure 2 is a top view of the same.

Similar letters of reference indicate corresponding parts.

This invention relates to a new improved cultivator or harrow, and consists in attaching a series of ordinary cultivator teeth to the ends of a set of slats or bars which are hung upon a frame in such a manner that the teeth can rise and fall to adapt themselves to the inequalities of the surface of the ground. Connected with the frame is a pair of handles, by which the teeth may be made to penetrate the earth more or less, as desired.

The advantage of my improvement consists in its working perfectly in rough and stony land, as each slat or bar moves freely, independently of the others, so that it can rise or fall when the tooth strikes a stone or falls in a hole without affecting their operation. When the teeth in a cultivator or harrow are all set rigidly in the frame, if an obstruction strikes one of the teeth, the whole frame is shocked, and the other teeth are thrown out, consequently the work is not evenly performed. This difficulty is corrected by my improved suspended harrow teeth. Another advantage consists in the facility with which the implement is moved from place to place without injury to the teeth, by simply turning up the bars to which they are attached, so they may rest upon a movable bar, as hereinafter described.

A A represents a strong square-sided frame, mounted at the front end on two guide-wheels B B, to be drawn by a team as usual. Between the sides of the frame a set of bars, $a\ a\ a$, are hung at one end upon a rod, $b$, running across the front part of the frame, which bars $a\ a$ are separated from each other by blocks $c\ c$, placed between them on the rod $b$, to keep them even and allow them to work up and down freely. The bars may be separated in other ways. On the top of the sides of the frame is a bar, $d$, which bears upon the upper sides of the suspended bars $a\ a$, and may be moved forward or backward in its position thereon, to regulate the leverage of the draught on the cultivators and force them deeper or shallower, as required. The ends of the movable bar $d$ are secured under rails $e\ e$, by pins $h\ h$. On the outer ends of the suspended bars $a\ a$ are fixed ordinary cultivator teeth $s\ s$. A pair of handles, $k\ k$, is attached to a cross-bar, $m$, which rests on the rear ends of the bars $a\ a$. The handles are hooked at the front ends to the top of the frame, and the bar $m$ may be pressed down by them, when desired, to force the teeth into the ground.

The operation of the implement is obvious, as before described, and the teeth may be raised from the ground by resting the bars $a\ a$ upon the movable bar $d\ d$, to move the harrow from place to place without injury.

Having described my invention, I claim as new, and desire to secure by Letters Patent—

The combination of the frame A mounted on guide-wheels B B, the bars $a\ a$ suspended on the cross-rod $b$, the movable cross-bar $d$, and the cross-bar $m$ attached to the handles $k\ k$, arranged and operating as and for the purpose herein described.

HENRY W. OSTROM.

Witnesses:
ARTHUR MEIGS,
ALFRED CRAWFORD.